US009253260B1

(12) United States Patent
Bailey et al.

(10) Patent No.: US 9,253,260 B1
(45) Date of Patent: Feb. 2, 2016

(54) HYBRID ZONE CONTROL SYSTEM

(75) Inventors: Michael Bailey, Brick, NJ (US); John Phillip Brown, Cream Ridge, NJ (US)

(73) Assignee: EWC Controls Incorporated, Englishtown, NJ (US)

( * ) Notice: Subject to any disclaimer, the term of this patent is extended or adjusted under 35 U.S.C. 154(b) by 638 days.

(21) Appl. No.: 13/618,953

(22) Filed: Sep. 14, 2012

Related U.S. Application Data

(60) Provisional application No. 61/580,851, filed on Dec. 28, 2011.

(51) Int. Cl.
G06F 15/16 (2006.01)
H04L 29/08 (2006.01)
H04L 12/28 (2006.01)
H04L 12/46 (2006.01)
G05D 23/19 (2006.01)
F24F 11/00 (2006.01)

(52) U.S. Cl.
CPC .......... H04L 67/125 (2013.01); G05D 23/1934 (2013.01); H04L 12/2832 (2013.01); H04L 12/4625 (2013.01); H04L 67/12 (2013.01); F24F 2011/0067 (2013.01)

(58) Field of Classification Search
CPC ............. F24F 2011/0067; H04L 67/12; H04L 67/125; H04L 12/2832; H04L 12/4625; G05D 23/1934
USPC ......................................................... 709/246
See application file for complete search history.

(56) References Cited

U.S. PATENT DOCUMENTS

| 5,927,398 | A * | 7/1999 | Maciulewicz | 165/209 |
| 2003/0079000 | A1* | 4/2003 | Chamberlain | 709/220 |
| 2003/0079001 | A1* | 4/2003 | Chamberlain | 709/220 |
| 2006/0071089 | A1* | 4/2006 | Kates | 236/94 |
| 2007/0157644 | A1* | 7/2007 | Kim et al. | 62/157 |
| 2007/0260801 | A1* | 11/2007 | Kwak et al. | 710/305 |
| 2008/0183307 | A1* | 7/2008 | Clayton et al. | 700/8 |
| 2009/0057425 | A1* | 3/2009 | Sullivan et al. | 236/51 |
| 2009/0261174 | A1* | 10/2009 | Butler et al. | 236/51 |
| 2010/0268801 | A1* | 10/2010 | Yukimasa | 709/220 |
| 2011/0031322 | A1* | 2/2011 | Zou et al. | 236/1 B |
| 2011/0046792 | A1* | 2/2011 | Imes | F24F 11/0086 700/278 |
| 2011/0231020 | A1* | 9/2011 | Ramachandran et al. | 700/278 |
| 2012/0253521 | A1* | 10/2012 | Storm et al. | 700/276 |

* cited by examiner

OTHER PUBLICATIONS

"Technical Bulletin: TB-226 Model NCM300 Zone Control System", EWC Controls Inc., © Apr. 2006.

Primary Examiner — Joseph E Avellino
Assistant Examiner — James Conaway
(74) Attorney, Agent, or Firm — Lerner, David, Littenberg, Krumholz & Mentlik, LLP

(57) ABSTRACT

A system and method for using multiple ClimateTalk™ compliant thermostats in a zoned HVAC system are provided. The system may include a first ClimateTalk™ thermostat in a first zone, a second ClimateTalk™ thermostat in a second zone, a third ClimateTalk or 24v AC thermostat in a third zone, and a ClimateTalk™ HVAC unit and/or 24v AC HVAC unit, for servicing the demands in the first, second and third zones. A controller in the zoned HVAC system may establish a ClimateTalk™ network between the controller and the HVAC unit, where the controller may identify itself as the sole ClimateTalk™ thermostat in this network. The controller may also establish additional ClimateTalk™ networks between the controller and each of the first, second and third thermostats, by identifying the controller as a distinct ClimateTalk™ HVAC unit in each of the respective additional networks.

14 Claims, 11 Drawing Sheets

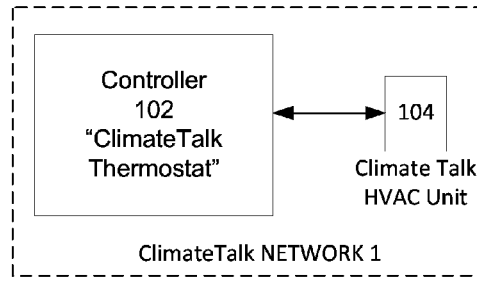

Controller 102 establishes a ClimateTalk Network 1 between itself and the ClimateTalk HVAC Unit 104 in which the Controller 102 Announces itself to the HVAC Unit 104 as the sole ClimateTalk Thermostat in Network 1.

FIG. 2A

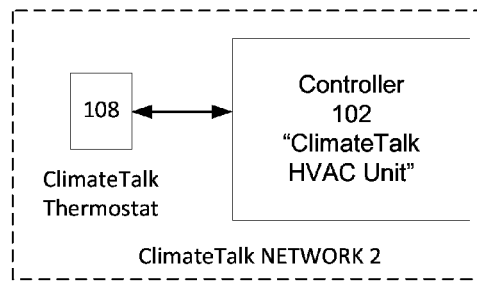

Controller 102 establishes a ClimateTalk Network 2 between itself and the ClimateTalk Thermostat 108 in which the Controller 102 Announces itself to the ClimateTalk Thermostat 108 as a ClimateTalk HVAC Unit in Network 2.

FIG. 2B

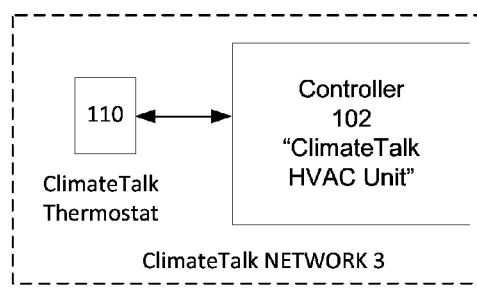

Controller 102 establishes a ClimateTalk Network 3 between itself and the ClimateTalk Thermostat 110 in which the Controller 102 Announces itself to the ClimateTalk Thermostat 110 as a ClimateTalk HVAC Unit in Network 3.

FIG. 2C

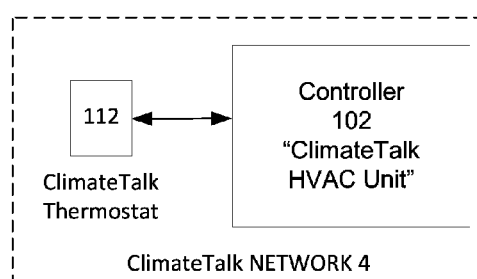

Controller 102 establishes a ClimateTalk Network 4 between itself and the ClimateTalk Thermostat 112 in which the Controller 102 Announces itself to the ClimateTalk Thermostat 112 as a ClimateTalk HVAC Unit in Network 4.

FIG. 2D

HYBRID ZONE CONTROL SYSTEM

CROSS-REFERENCE TO RELATED APPLICATIONS

The present application claims the benefit of the filing date of U.S. Provisional Patent Application No. 61/580,851 filed Dec. 28, 2011, the disclosure of which is hereby incorporated herein by reference.

FIELD OF INVENTION

The present invention is generally directed to Heating, Ventilation, and Air Conditioning (HVAC) systems. More particularly, the present invention is directed towards a novel system and method for providing zone control in a zoned HVAC system including one or more HVAC components (such as, for e.g., thermostats, furnaces, air conditioners, and fans) that operate in accordance with the ClimateTalk™ (hereinafter, "ClimateTalk") protocol.

BACKGROUND OF THE INVENTION

ClimateTalk is an open communication standard networking protocol that provides a mechanism for communicating messages between multiple types of components in an HVAC system using a common messaging structure over a physical medium. It is promulgated and supported by the ClimateTalk alliance, which is formed by a consortium of vendors in the HVAC industry. The CT-485 specification defines the physical medium requirements (e.g., the network layer, datalink layer, and physical layer specifications) for a network over which application level messages using the ClimateTalk protocol can be sent between various networked devices. The ClimateTalk alliance has promulgated a CT-485 Serial Hardware Specification for implementing the ClimateTalk protocol over the CT-485 network. At present, the latest version promulgated by the ClimateTalk alliance is CT-485 Serial hardware specification version 1.1, which was released on Jun. 23, 2011, the disclosure of which is incorporated herein by reference.

In a zone control HVAC system, a zone control manager (hereinafter, "controller") manages the heat/cool/fan demands from multiple thermostats which are each typically located in different zones (physical areas) of a residential or commercial structure. The controller responds to the demands from each of the multiple thermostats in the different zones by operating individual airflow damper(s) which typically interconnect a HVAC unit (e.g., a forced air furnace and/or air conditioning unit) to each zone. The controller further controls the HVAC unit to satisfy the specific demands received from the thermostats in each specific zone of the zone control system.

While the ClimateTalk protocol provides a number of advantages in an HVAC system, such as a measure of compatibility between various HVAC components manufactured by different vendors, ease of use via Plug and Play (PnP) capability, and the ability to service proportional demand (as opposed to the on/off binary operation of conventional analog 24v AC HVAC components), the ClimateTalk protocol includes limitations that can make it unsuitable for use in a zone control HVAC system. These limitations stem from requirements in the ClimateTalk protocol, which generally limit the number of particular types of devices that may communicate with a single unit in a given HVAC system. For example, the ClimateTalk protocol requirements presently allow for only one ClimateTalk compliant thermostat device to be included in a particular ClimateTalk HVAC system.

This requirement is an impediment to vendors who wish to provide customers with the advantages and convenience of using ClimateTalk compliant devices in a zoned HVAC system. This is because, as described above, a zoned HVAC system typically includes a distinct thermostat in each zone of the HVAC system. However, the ClimateTalk protocol, in its present state, precludes the usage of more than one ClimateTalk thermostat in a given HVAC system. Thus, systems and methods that allow use of ClimateTalk devices in an integrated zone control HVAC system without limiting the number and type of device are desirable.

BRIEF SUMMARY OF THE INVENTION

Various aspects of the systems and methods disclosed herein may be implemented in hardware, software, or a combination of both.

A hybrid zoned HVAC system is provided.

BRIEF DESCRIPTION OF THE DRAWINGS

FIG. 2 illustrates an example of a process in accordance with one aspect of the present disclosure.

DETAILED DESCRIPTION

Figure 1:
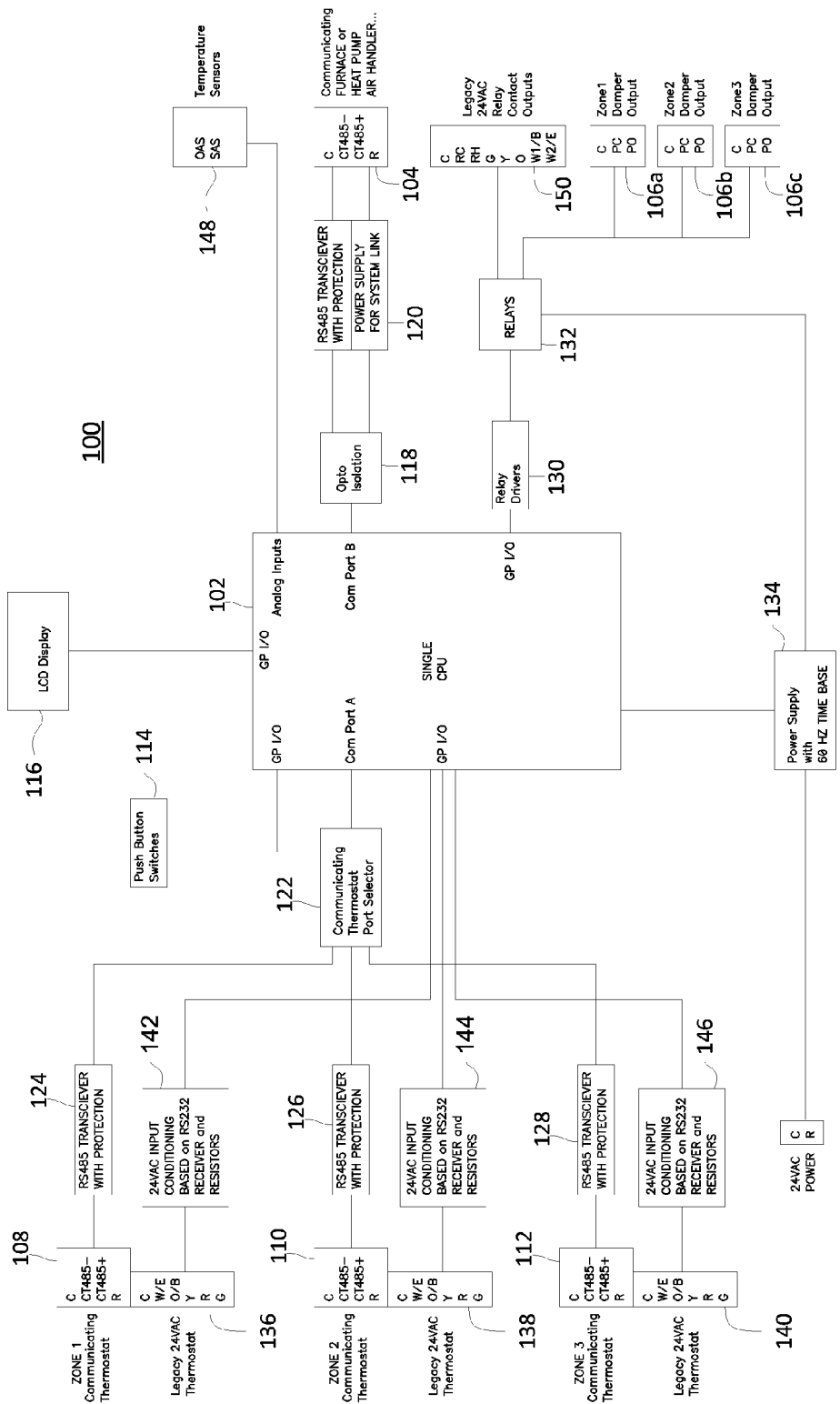
FIG. 1 illustrates a diagram showing an example of a hybrid zone control HVAC system in accordance with various aspects of the invention.
Figure 3:
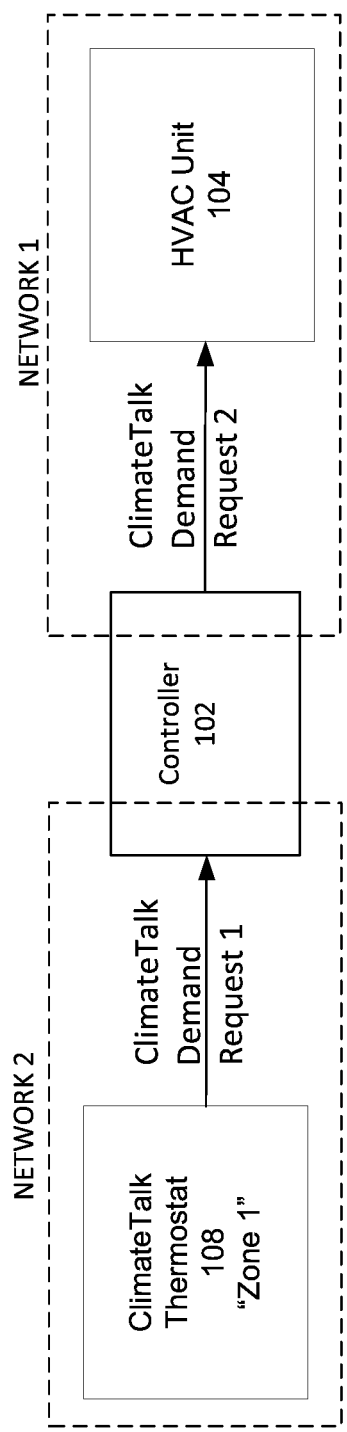
FIG. 3 illustrates an example operation of the hybrid zone control HVAC system in accordance with one aspect of the present disclosure.

FIG. 1 is a functional block diagram illustrating an example of a zoned HVAC system 100 in accordance with various aspects of the present invention. The zoned HVAC system 100 includes various ClimateTalk compliant components such as a ClimateTalk controller 102, a ClimateTalk HVAC unit 104, zone dampers 106a, 106b, and 106c, and ClimateTalk thermostats 108, 110 and 112 which are each located in a separate zone (labeled as "Zone 1", "Zone 2", and "Zone 3") of the zoned ClimateTalk HVAC system 100.

In one embodiment, the controller 102 may be a programmable embedded processor configured to operate in accordance with the ClimateTalk protocol. It will be understood that controller 102 is not limited to any particular type of processor, and may thus be implemented using any commercially available microprocessor or microcontroller. In one aspect the controller 102 may be programmed using any computing language (e.g., assembly, C/C++, Java, etc.) to provide the functionality described in detail below. In this regard, the controller 102 may be configured to operate in accordance with one or more instructions provided in the form of an executable program that is stored in internal memory (e.g., RAM or ROM) of the controller 102, or in a external memory (e.g., Flash memory, hard drive, CD Rom, etc.) accessible to the controller 102. In addition, part or all of the functionality of the controller 102 may also be implemented in hardware, such as in a dedicated ASIC or a set of integrated circuits that are designed and/or configured to operate in accordance with aspects of the invention.

In one embodiment, the controller 102 may include one or more input/output (I/O) ports (variously labeled in FIG. 1 as "Com Port A", "Com Port B", "GP I/O" and "Analog Inputs") that may be used to communicatively couple the controller 102 with various components of the HVAC system 100. In FIG. 1, the controller 102 is illustrated as being communicatively interfaced with the HVAC unit 104, zone dampers 106a, 106b, and 106c, and the zoned ClimateTalk thermostats 108, 110 and 112 via one or more I/O ports.

The controller 102 may include sufficient I/O ports such that each I/O port may be dedicated to interface with a specific component of the HVAC system 100. As shown in FIG. 1 for example, one general purpose GP I/O port may be dedicated to interface with a set of push button switches 114 while another general purpose GP I/O port may be dedicated to interface with an LCD display 116. Together, the push button switches 114 and LCD display 116 may respectively provide an interactive mechanism for a user to program, control and monitor the operation of the controller 102. For example, a user may monitor various status, error, or other message outputs by the controller 102 to the LCD display 116 regarding the operation and function of one or more components of the HVAC system 100. Similarly, the user may use one or more combinations of the push button switches 114 to setup the controller 102 to operate according with a specific configuration of the HVAC system.

Similarly, the I/O port labeled as "Com Port B" of the controller 102 may be dedicated to communicating with the ClimateTalk HVAC unit 104 using the ClimateTalk protocol. An optical isolation circuit 118 and transceiver unit 120 may be included between the I/O port "Com Port B" and the HVAC unit 104 in order to respectively provide electrical isolation and to condition the voltage and current signals as provided for in the CT-485 specification.

Alternatively or in addition, a single I/O port may also be used to communicate with more than one component of the HVAC system 100. As shown in FIG. 1 for example, the I/O port labeled as "Com Port A" may be configured to selectively enable the controller 102 to communicate with any one of the zoned ClimateTalk thermostats 108, 110 and 112 via a port selector 122 in accordance with the ClimateTalk protocol. The port selector 122 may be implemented as a multiplexer/de-multiplexer circuit such that it allows selective two-way communication between the controller 102 and each of the ClimateTalk thermostats 108, 110 and 112. As with Com Port B, appropriate transceiver units 124, 126 and 128 may be included for providing proper physical signal conditioning between each of the zoned ClimateTalk thermostats 108, 110 and 112 and the controller 102 in accordance with the CT-485 specification.

The controller 102 may also be interfaced with each of the zone dampers 106a, 106b, and 106c using a single general purpose I/O port (labeled as "GP I/O" in FIG. 1.). In the embodiment shown in FIG. 1, the controller 102 may open or close the individual zone dampers 106a, 106b, and 106c by operating one or more relay drivers 130, which, in turn may drive the relays 132 to mechanically open or close (either partially or completely) one or more of the zone dampers 106a, 106b, and 106c as desired. The relays 132, controller 102 and the various components of the HVAC system 100 may be powered by a common power supply 134 using appropriate voltage and current regulation.

The HVAC system 100 illustrated in FIG. 1 is a universal (e.g., hybrid) system that supports both ClimateTalk HVAC components and legacy HVAC components at the same time, and thus provides a flexible and economical hybrid solution without forcing vendors to choose between a ClimateTalk compliant system and a 24v AC legacy system. Accordingly, in one aspect the HVAC system 100 depicted in FIG. 1 may not only include HVAC components that comply with the ClimateTalk protocol (such as the ClimateTalk thermostats 108, 110, and 112 and the ClimateTalk HVAC unit 104), but may also include one or more legacy or conventional 24v AC HVAC components. While conventional 24v AC HVAC components do not have the communication capabilities of the networked ClimateTalk components, they are still widely used in many applications.

As shown in FIG. 1 for example, the HVAC system 100 may also include conventional HVAC components such as the 24v AC thermostats 136, 138, 140 that are respectively interfaced using appropriate signal conditioning circuits 142, 144, and 146 to a single general purpose GP I/O port of the controller 104. In this hybrid configuration, one, two or more of the ClimateTalk thermostats 108, 110 or 112 may also, if desired, be replaced with a conventional 24v AC thermostat in the respective zone. Alternatively, the HVAC system 100 may also be configured into more zones or subzones (not shown), each of which may include a legacy 24v AC thermostat (or, for that matter, ClimateTalk thermostats). The controller 102 may receive and process conventional (e.g., analog) signals provided by the legacy 24v AC thermostats 136, 138, 140 and service them by, in turn, generating and transmitting appropriate ClimateTalk messages (e.g., demands) over a ClimateTalk network to the ClimateTalk HVAC unit 104 in accordance with the ClimateTalk protocol. Thus, it will be appreciated that the hybrid HVAC system 100 illustrated in FIG. 1 is able to advantageously support both ClimateTalk thermostats in one or more zones (or subzones) and legacy 24v AC thermostats in one or more other zones (or subzones) and interface both with the ClimateTalk HVAC unit 104.

As with the thermostats, the hybrid HVAC system 100 may also include a legacy 24v AC HVAC unit 150 in place of or in addition to the ClimateTalk HVAC unit 104. If there are many zones in an HVAC system, there may be advantages in including both the 24v AC HVAC unit 150 and the ClimateTalk HVAC unit 104, as the system may meet the demands in the various zones more efficiently. For example, one or more additional zone dampers 106a, 106b, and/or 106c may be interconnected to each HVAC unit such that each HVAC unit may supply part (or all) of the demand in a given zone.

In another aspect, the ClimateTalk HVAC unit 104 and the conventional HVAC unit 150 may be designated as a primary unit and a backup unit, where the backup unit is used in situations where the demand is high or if there is a failure in the primary unit. In an HVAC system 100 which includes the 24v AC HVAC unit 150 as described above, the controller 102 may control the operation of the HVAC unit 150 using conventional signals and relay drivers 130 and relays 132.

In embodiments that include the 24v AC HVAC unit 150, the controller 102 may be configured to enable transparent communication between the ClimateTalk thermostats, the legacy 24v AC thermostats, and the legacy 24v AC HVAC unit 150. For example, the controller 102 may receive and process ClimateTalk demand messages from one of the ClimateTalk thermostats 108, 110, or 112 respectively. The controller may then parse and process the ClimateTalk messages received over the respective ClimateTalk network, and, in turn, may generate appropriate legacy signals for controlling the operation of the legacy 24v AC HVAC unit to service the demands received from each zone respectively. This aspect allows the controller to operate a ClimateTalk compatible Air Conditioner in the summer and a 24v AC Conventional Boiler during the winter. Another aspect of the hybrid Controller 102 is the ability to operate a ClimateTalk Heat Pump for Cooling and Heating and operate a 24v AC compatible boiler as a back-up or Emergency heat source.

In all the examples provided above, it will be understood that one or more of the configurations may require additional zone dampers, relay circuitry, etc., for supporting the chosen configuration. Furthermore, the controller 102 may be configured such that it may transmit demands received from the ClimateTalk thermostats 108, 110 and 112, or from the legacy 24v AC thermostats 136, 138, 140, to either the ClimateTalk HVAC unit 104 (in accordance with the ClimateTalk protocol) and/or to the legacy 24v HVAC unit 150 using conventional 24v AC signaling simultaneously.

In view of the above, it will be appreciated that the hybrid zoned HVAC system 100 disclosed in FIG. 1 is a universal HVAC system that can not only support ClimateTalk compliant HVAC components such as the ClimateTalk thermostats 108, 110, 112 and the ClimateTalk HVAC unit 104, but can also support legacy 24v AC HVAC components such as the 24v AC HVAC unit 150 and the 24v AC thermostats 136, 138 and 140 in the same system. In addition, it should be understood that the present disclosure is not limited to any particular ClimateTalk component shown in FIG. 1, and it is contemplated that in various aspects the system 100 may include other ClimateTalk compatible components such as water heaters, major kitchen appliances and smart electric meters that may be communicatively interfaced via one or more of the ClimateTalk thermostats 108, 110 and 112 in accordance with ClimateTalk protocol.

As described previously, the ClimateTalk protocol limits the number of particular types of devices to a single unit in a given HVAC system. In other words, duplicate component of certain types are not permitted by the present and prior versions of ClimateTalk protocol. For example, the ClimateTalk protocol requirements presently allow for only one ClimateTalk compliant thermostat device to be included in a ClimateTalk HVAC system. This requirement is imposed at the time of initialization, when each respective ClimateTalk component (e.g., the ClimateTalk thermostat, 108, 110, or 112) in a given HVAC system becomes "aware" of the presence of other ClimateTalk components (e.g., the ClimateTalk HVAC unit 104) and performs handshaking to enable communications between the various components. The exemplary zoned HVAC system illustrated in FIG. 1 provides a solution that enables the use of multiple ClimateTalk thermostats (e.g., ClimateTalk thermostats 108, 110, and 112) that are each located in different zones. Particular aspects of the HVAC system 100 that enable usage of multiple ClimateTalk thermostats 108, 110 and 112 that are each located in a different zone (e.g., "Zone 1", "Zone 2" and "Zone 3") of the universal HVAC system 100 are now described below.

In various aspects, the controller 102 is configured to function as an intelligent bridge between the ClimateTalk thermostats 108, 110, and 112 and the ClimateTalk HVAC unit 104. A ClimateTalk network may have multiple components or nodes. For example, a ClimateTalk network may be a two node network with a ClimateTalk furnace (as an HVAC unit) and a ClimateTalk thermostat, or it may be a four node network with a furnace, air handler, heat pump as integrated or independent HVAC units and a thermostat. In either case, the ClimateTalk network will typically have a single ClimateTalk component that is a network coordinator (and a single ClimateTalk thermostat). Any one of the nodes can assume the role of the network coordinator in a ClimateTalk compliant network.

In the illustrated implementation of the hybrid ClimateTalk system in FIGS. 1 and 2, the controller 102 may be configured such that the controller 102 performs as a network coordinator with respect to each of the ClimateTalk thermostats in the HVAC system 100. Furthermore, the controller 102 may also be configured such that, at the same time, the controller 102 responds as a subordinate with respect to other ClimateTalk nodes such as the HVAC unit 104 (e.g., a ClimateTalk furnace, ClimateTalk air conditioner and/or ClimateTalk heat pump) which may then assume network coordinator responsibilities vis-a-vis the controller 102. Thus, the controller 102 may enable seamless and transparent bidirectional communication between the multiple ClimateTalk thermostats 108, 110, and 112 that are each located in a different zone of the HVAC system 100 and one or more ClimateTalk HVAC units 104 in accordance with the ClimateTalk protocol.

In one aspect, the controller 102 is configured such that the controller 102 functions as the sole ClimateTalk thermostat in a distinct ClimateTalk network established by the controller 102 between the HVAC unit 104 and the controller. Additionally, the controller 102 is also configured such that the controller functions as a distinct ClimateTalk HVAC unit in distinct ClimateTalk networks established by the controller between each of the ClimateTalk thermostats 108, 110 and 112 and the controller respectively. As a result of such configuration, the controller 102 can intelligently enable or establish transparent bidirectional communication of ClimateTalk messages between each of the actual ClimateTalk thermostats 108, 110 and 112 located in different zones of the zoned HVAC system 100 and the actual ClimateTalk HVAC unit 104 without any perceived conflicts with the ClimateTalk protocol.

Similarly, the controller can also intelligently enable transparent communication between the one or more 24v AC thermostats 136, 138, and 140 and the ClimateTalk HVAC unit 104. For example, the controller 102 can receive and service conventional requests from each of the 24v AC thermostats and, in turn, generate and transmit appropriate ClimateTalk messages to the ClimateTalk HVAC unit 104 over the distinct ClimateTalk network established between the controller 102 and the ClimateTalk HVAC unit 104. Because the ClimateTalk HVAC unit 104 perceives the controller 102 as the sole ClimateTalk thermostat, the controller 102 may intelligently meet the demands in different zones of the hybrid HVAC system without the ClimateTalk HVAC unit 104 being aware of the true source or format of the requests.

In order to provide the foregoing features, in one aspect the controller 102 is configured to include the functionality of both a subordinate ClimateTalk component (e.g., a ClimateTalk thermostat), and a network coordinator component (e.g., a ClimateTalk HVAC unit) in accordance with the ClimateTalk protocol. For example, during the initialization phase of the zoned HVAC system 100, the controller 102 acts as a subordinate ClimateTalk component when interfacing with the ClimateTalk HVAC unit 104. Thus, the process may begin when the controller 102 receives an exploratory initialization ClimateTalk message (in the form of one or more ClimateTalk compliant data packets) from the ClimateTalk HVAC unit 104 inviting a response from one or more of the subordinate ClimateTalk components in the HVAC system 104. Rather than forwarding the initialization ClimateTalk message to any of the ClimateTalk thermostats 108, 110 and 112, the controller 102 intercepts this message and, in turn, responds to the HVAC unit 104 by announcing or identifying itself as the subordinate ClimateTalk thermostat. As a result, and as functionally illustrated in FIG. 2A, the controller 102 performs the handshaking process with the HVAC unit 104 to establish a distinct ClimateTalk network (e.g., "Network 1") between itself and the HVAC unit 104, where the controller 102 announces itself as a ClimateTalk thermostat such that the HVAC unit 104 perceives the controller 102 as the sole ClimateTalk thermostat in "Network 1" in accordance with the ClimateTalk protocol, and does not realize the presence of the ClimateTalk thermostats 108, 110 and 112 in the HVAC system 100.

In addition, the controller 102 acts as a ClimateTalk network coordinator component when interfacing with each of the ClimateTalk thermostats 108, 110 and 112 respectively. Thus, the controller 102 transmits a distinct exploratory initialization ClimateTalk message (in the form of one or more ClimateTalk data packets) to each of the ClimateTalk thermostats 108, 110 and 112, identifying or announcing itself as a ClimateTalk HVAC unit and inviting a separate response from each of ClimateTalk thermostats in response to each respective initialization message. Then, as each of the ClimateTalk thermostats 108, 110, and 112, responds to its respective initialization message, the controller 102 receives the response messages and, as functionally illustrated in FIGS. 2B, 2C and 2D, configures or establishes a distinct ClimateTalk network (e.g., "Network 2", "Network 3", and "Network 4") with each of the ClimateTalk thermostat 108, 110 and 112 respectively, such that each ClimateTalk thermostat perceives the controller 102 as a distinct (and only) ClimateTalk HVAC unit within its own respective network in accordance with the ClimateTalk protocol.

To summarize the foregoing process, each of the ClimateTalk thermostats 108, 110 and 112 perceives the controller 102 as a single and distinct HVAC unit located within a separate and distinct ClimateTalk network. Similarly, the HVAC unit 104 perceives the controller 102 as a single ClimateTalk thermostat located within its own separate and distinct ClimateTalk network.

After completion of the initialization process as described above, the controller 102 intelligently processes and bridges bidirectional communication between each of the ClimateTalk thermostats 108, 110 and 112 (and/or the 24v AC thermostats 136, 138, 140) in the separate zones of the HVAC system 100 and the ClimateTalk HVAC unit 104 in a manner that is transparent to each of the ClimateTalk components.

As an example, consider the case in which the ClimateTalk thermostat 108 transmits a message or request for additional demand ("demand request 1") from "Zone 1" of the zoned HVAC system 100. Because, as described above, the ClimateTalk thermostat 108 perceives the controller 102 as the HVAC unit in its network ("Network 2"), it transmits the demand request 1 (in the form of one or more ClimateTalk data packets) over "Network 2" to the "Network 2" address of controller 102 as determined during the initialization stage. In turn, the controller 102, which receives the demand request from the "Network 2" address associated with ClimateTalk thermostat 108, is aware that this demand request is associated with "Zone 1" of the HVAC system 100.

Upon receipt of the demand request over "Network 2" from ClimateTalk thermostat 108, the controller 102 in turn parses the received demand request from the ClimateTalk thermostat 108, recognizes it as such by determining the content of the request, and generates and transmits a similar but new "demand request 2" in accordance with the ClimateTalk protocol to the address (as established during the initialization phase) of the ClimateTalk HVAC unit 104 over "Network 1", where the demand in the new request is the same as the demand received from the thermostat 108. Because the Climate HVAC unit 104 perceives the controller 102 as the ClimateTalk thermostat in "Network 1", the HVAC unit 104 accepts and provides output in accordance with the "demand request 2" as received from the "Network 1" address of the controller 102.

In addition, the controller 102 may also change the configuration (e.g., open or close) one or more of the zone dampers (FIG. 1) associated with "Zone 1" (in this case zone damper 106a), in order to ensure that Zone 1 receives the desired output provided by the HVAC unit 104 efficiently.

As illustrated in the example above, the controller 102 is configured to intelligently and transparently bridge the different networks in which the HVAC unit 104 and each of the ClimateTalk thermostats 108, 110, and 112 are located, without these components being aware of each other. In addition, the controller 102 may continue to process the various types of messages supported by the ClimateTalk protocol, such as demand messages, status messages, and error messages in a transparent manner. For example, controller 102 may receive and process demand requests from ClimateTalk thermostat 110 (over "Network 3") and ClimateTalk thermostat 112 (over "Network 4") by making similar demand requests in its role as the ClimateTalk thermostat over "Network 1" to the HVAC unit 104 in the manner described above. As another example, the controller 102 may also receive an error message (or a status message) from the HVAC unit 104 over "Network 1", recognize it as such, and transmit similar error messages (or status messages) to each of the three ClimateTalk thermostats 108, 110, and 112 over "Network 2", "Network 3" and "Network 4" respectively. As a result, the actual ClimateTalk thermostats 108, 110, and 112 located in the different zones of the HVAC system 100 may receive (and transmit) error messages (or status messages) appropriately to respective nodes of the HVAC system 100, such as the HVAC unit 104.

As seen above, the hybrid zone control system 100 shown in FIG. 1 advantageously enables bidirectional communication between multiple ClimateTalk thermostats each of which may be located in a different zone of a zoned HVAC system with a ClimateTalk HVAC unit in a manner that overcomes the limitations of the versions of the ClimateTalk protocol which do not allow such functionality. In addition, the hybrid zone control system shown in FIG. 1 also supports inclusion of conventional or legacy analog 24v AC analog thermostats in one or more zones of the zoned HVAC system. As noted previously, for example, the controller 102 may receive and process conventional (e.g., analog) signals provided by the legacy 24v AC thermostats 136, 138, 140 and service them by, in turn, generating and transmitting appropriate and corresponding ClimateTalk messages (e.g., demands) over a ClimateTalk network to the ClimateTalk HVAC unit 104 in accordance with the ClimateTalk protocol.

Figure 4:
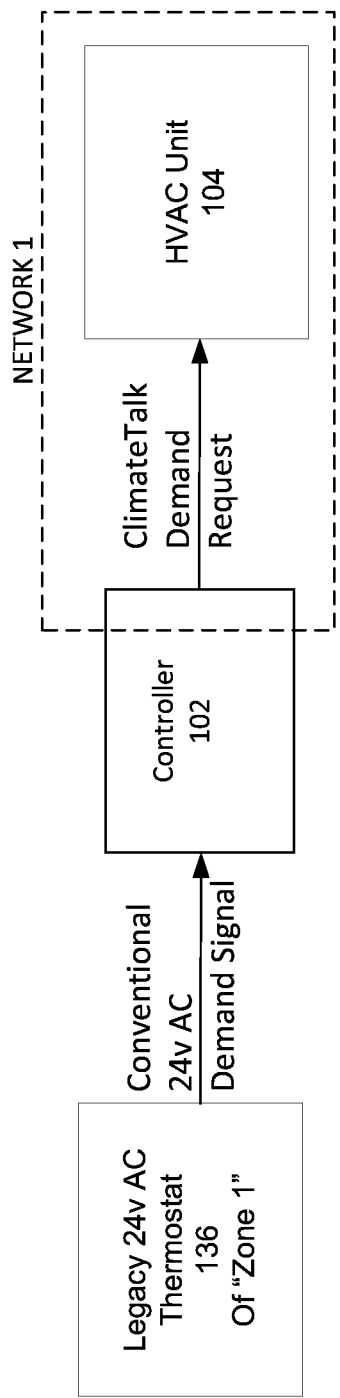
FIG. 4 illustrates another example operation of the hybrid zone control HVAC system in accordance with another aspect of the present disclosure.
Figure 5A:
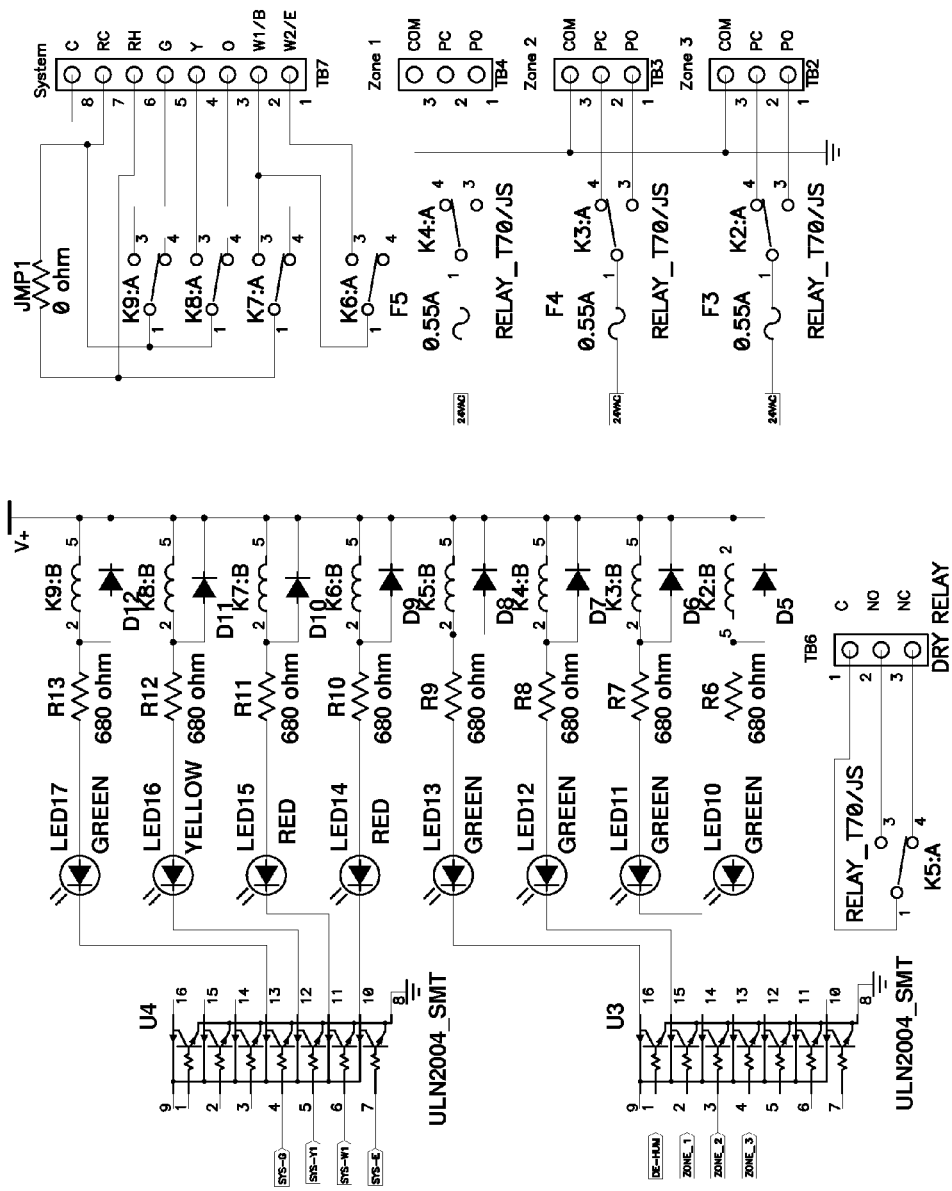
FIGS. 5A-5G illustrate example schematics for implementing the hybrid zone control system depicted in FIG. 1.
Figure 5B:
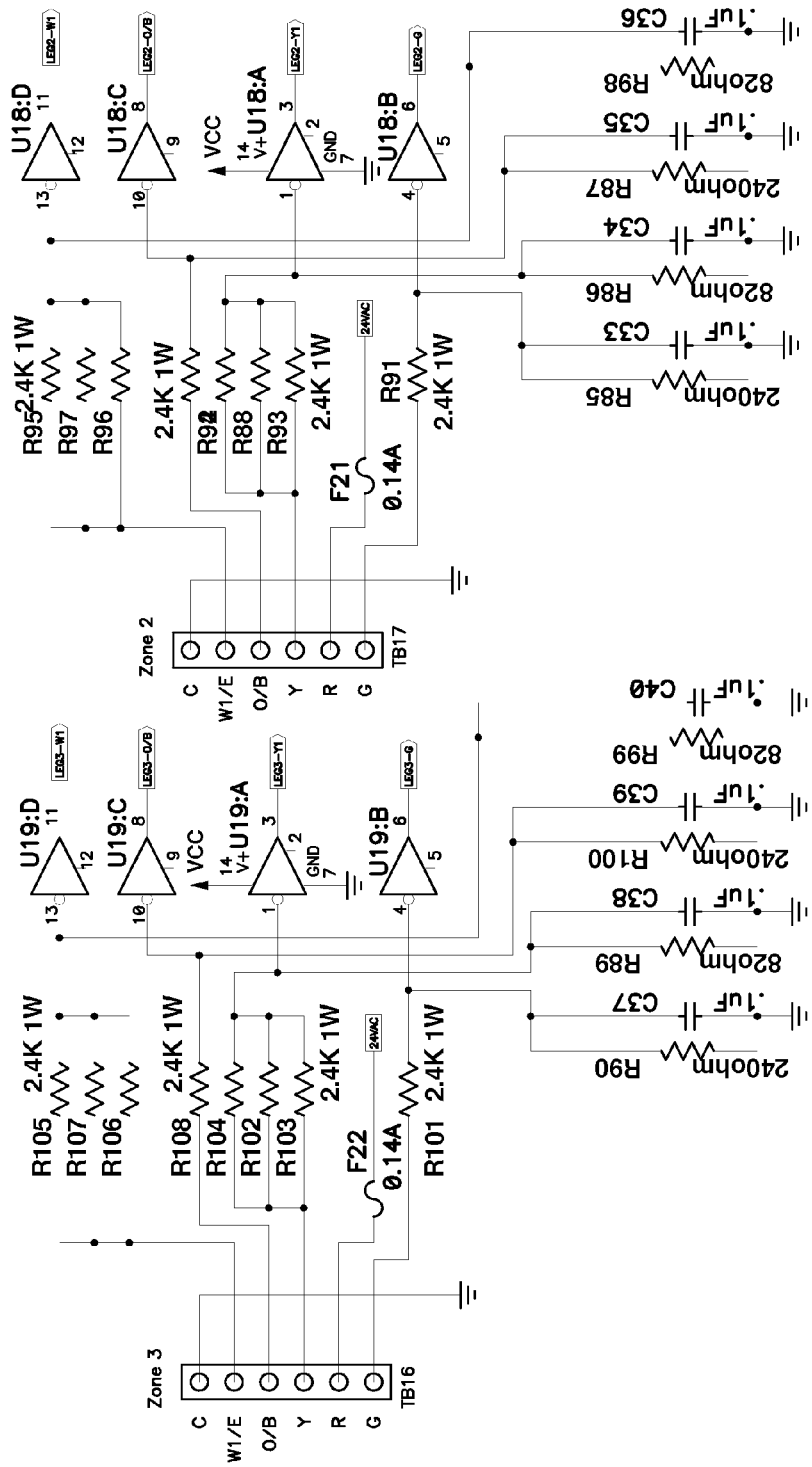
Figure 5C:
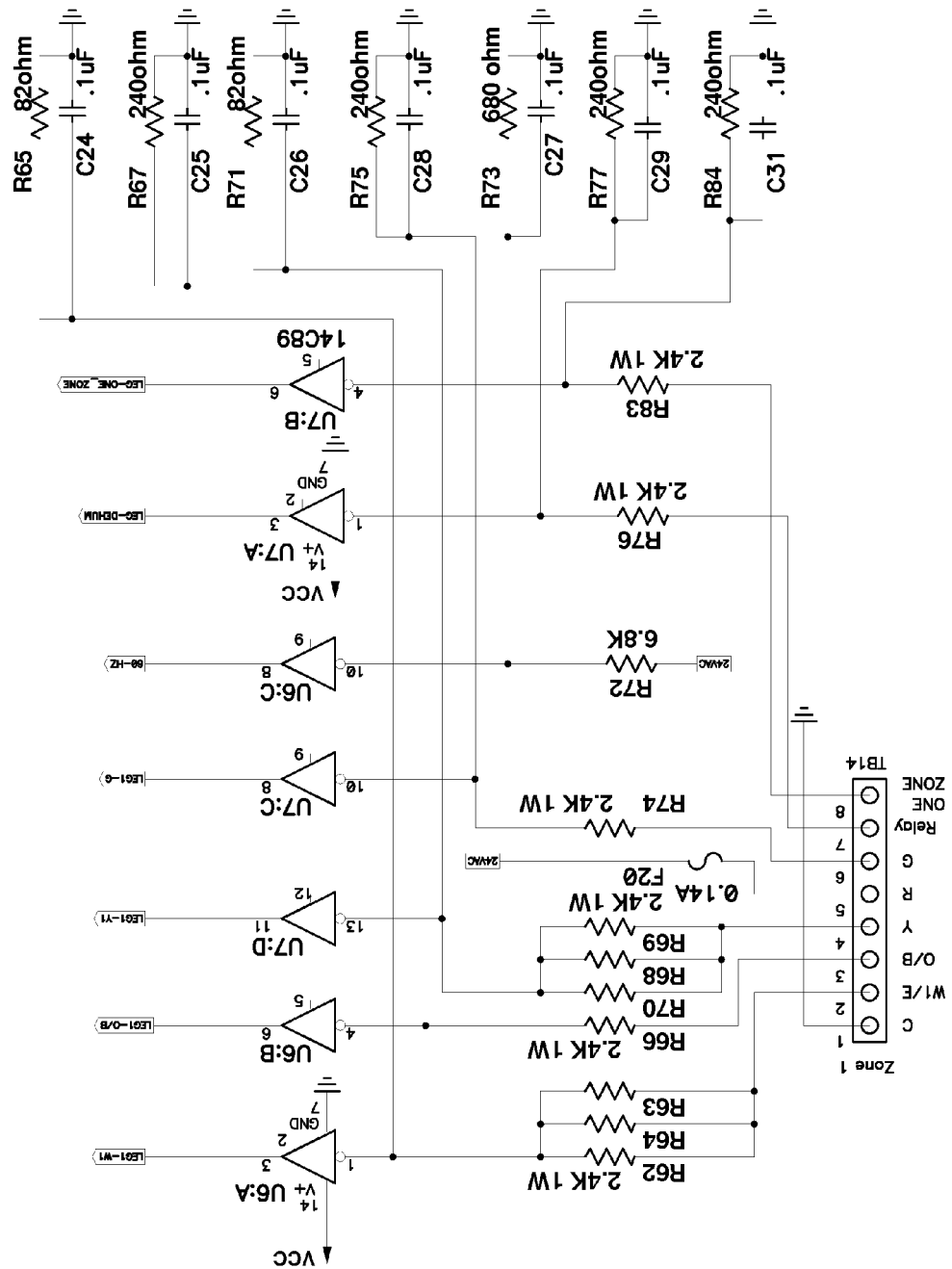
Figure 5D:
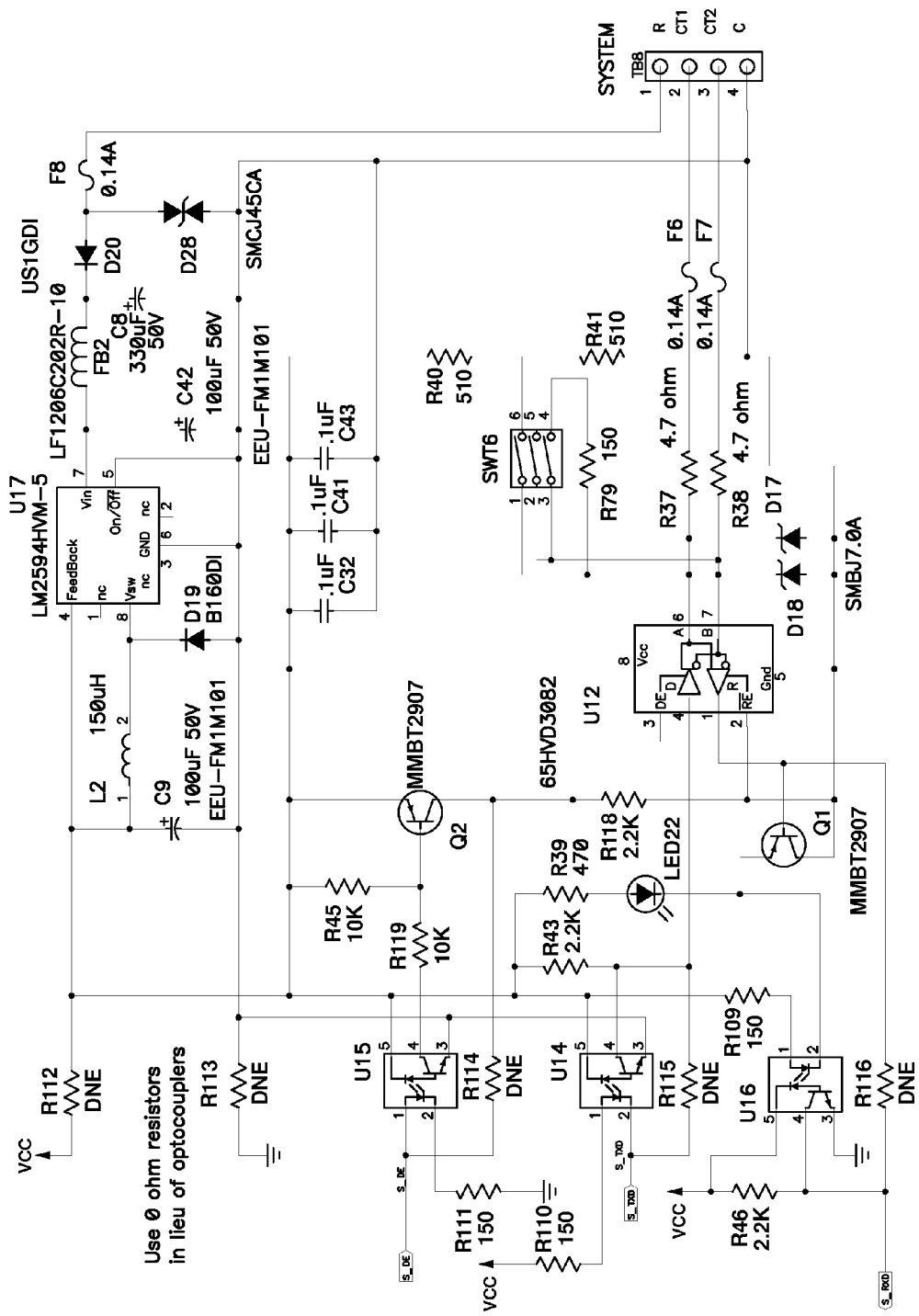
Figure 5E:
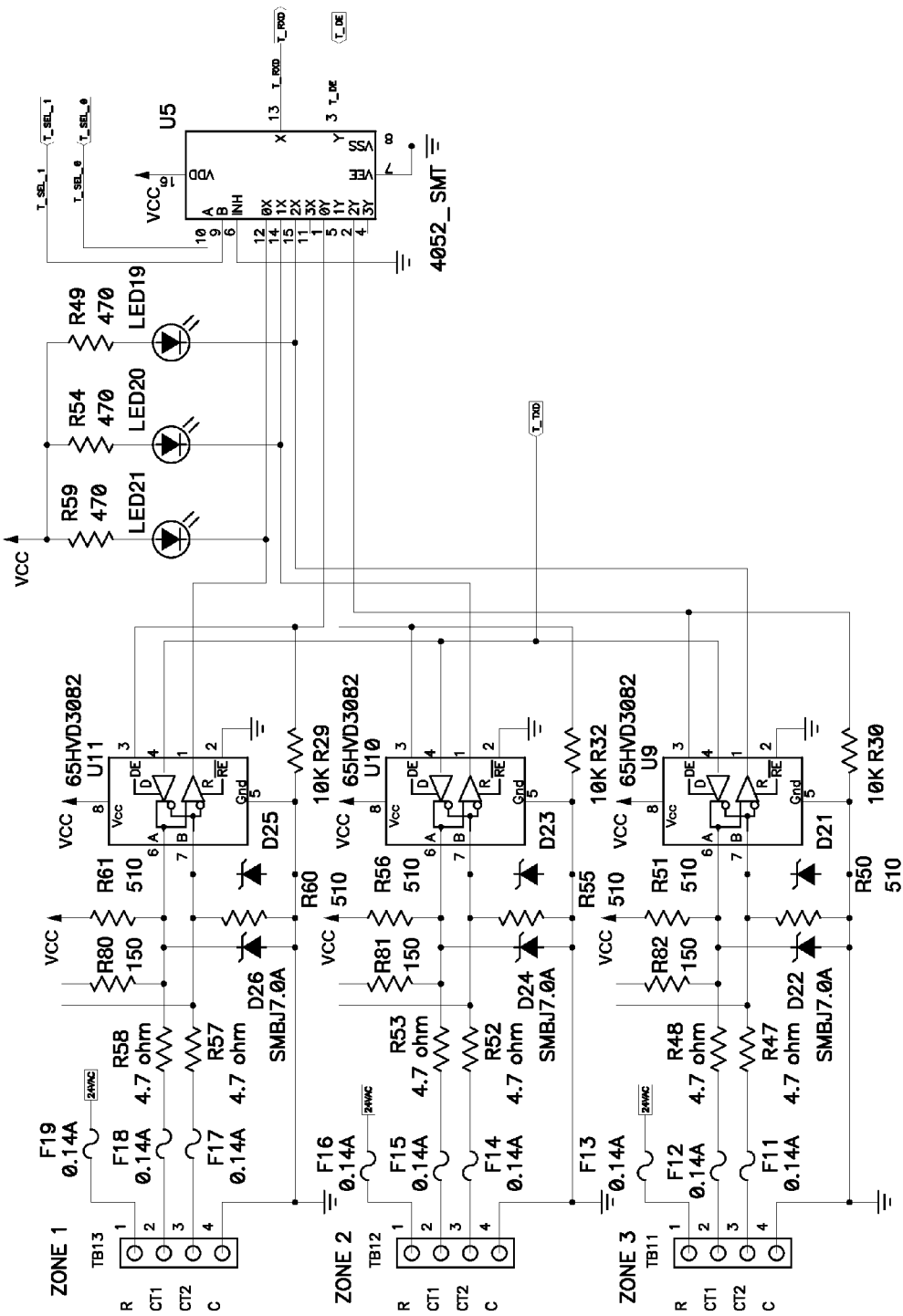
Figure 5F:
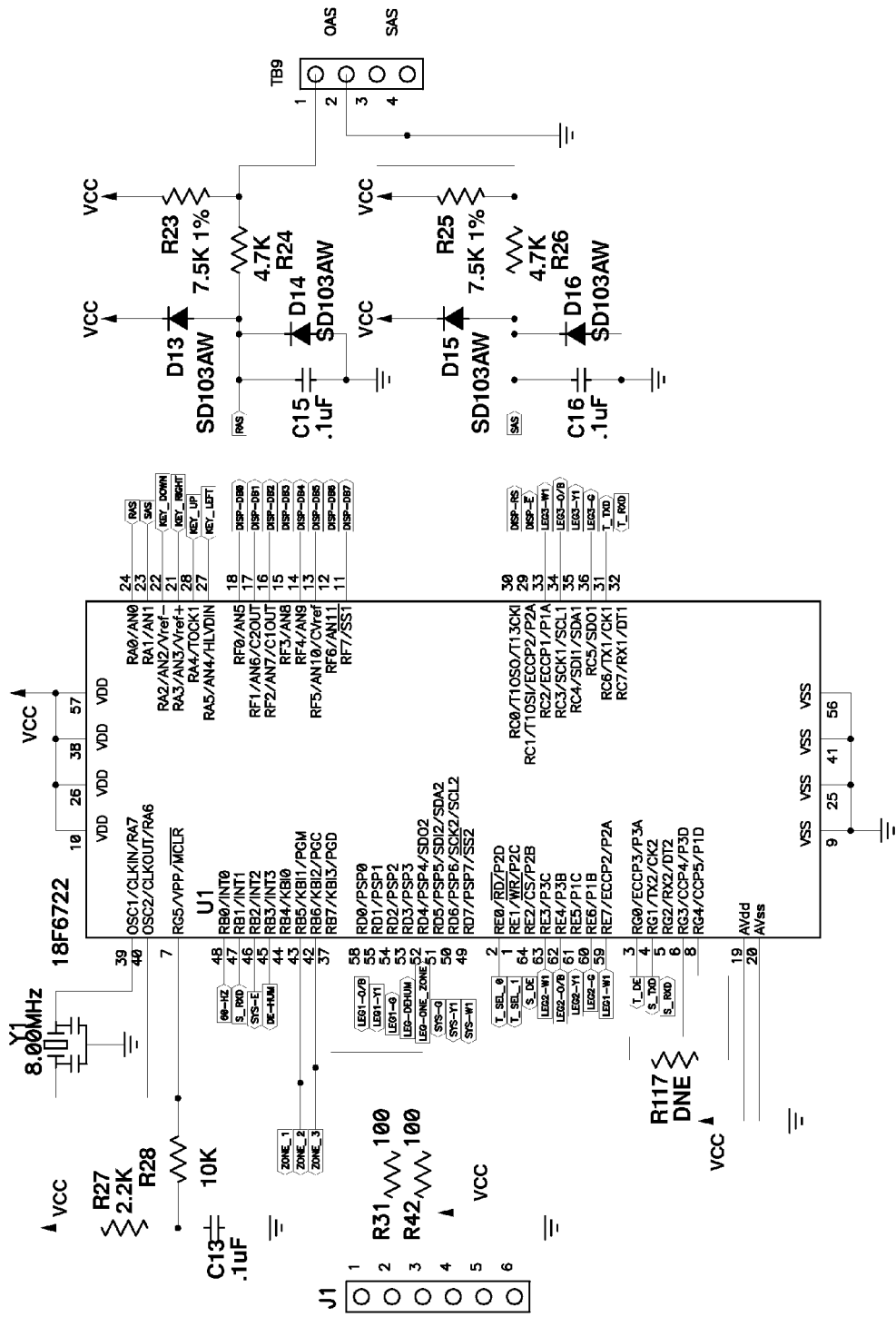
Figure 5G:
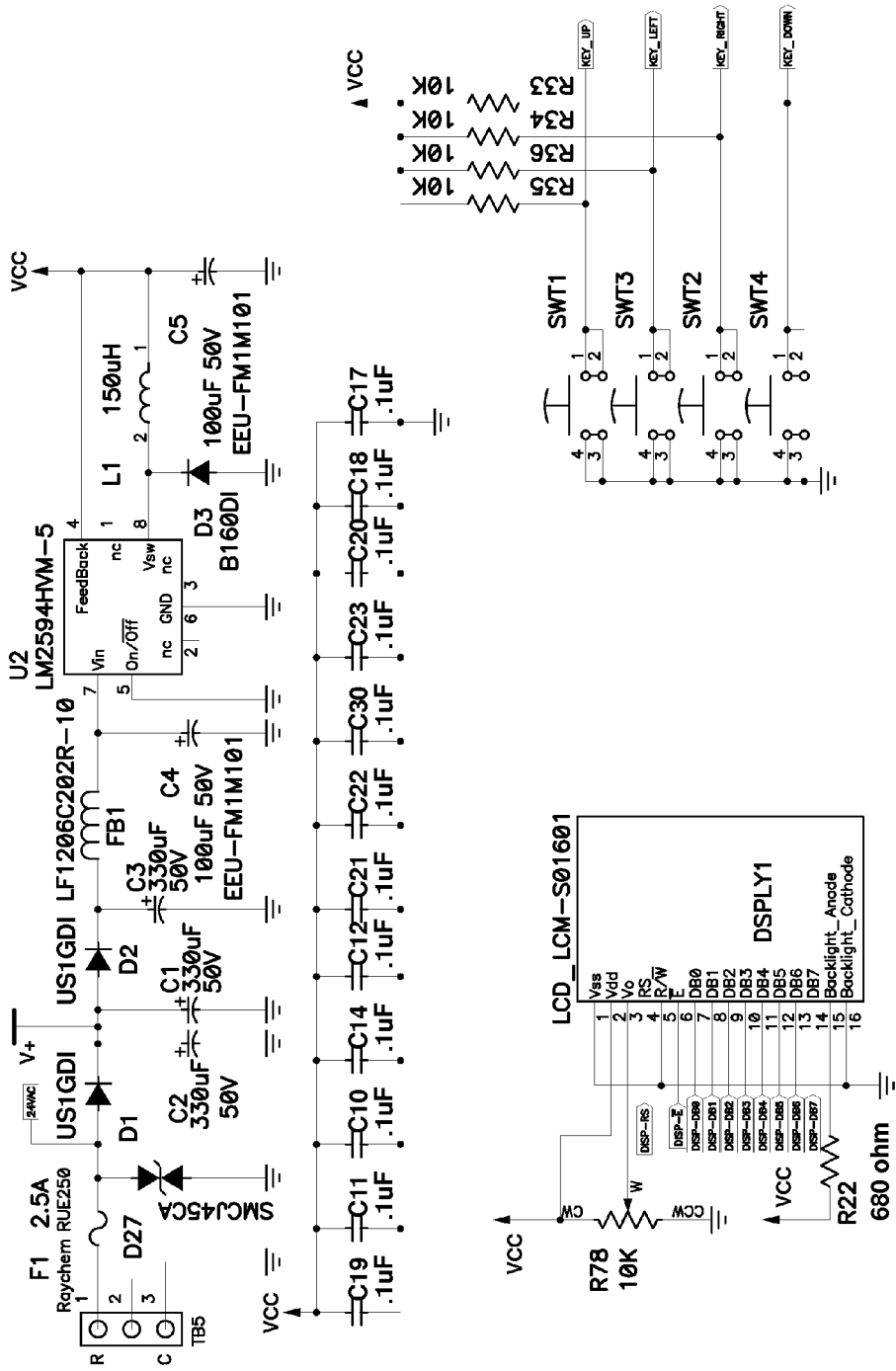

This aspect is now functionally illustrated with reference to FIG. 4. As seen therein, the controller 102 may receive an analog demand signal from a legacy 24v AC thermostat located in a zone of the HVAC system 100. In this example, it is assumed that the controller receives the analog demand signal from the legacy 24v AC thermostat 136 located in "Zone 1" of the HVAC system 100. The controller may be configured to interpret the analog demand signal received from the legacy 24v AC thermostat 136, and in turn, to generate a corresponding "ClimateTalk demand request" for the requested demand in accordance with the ClimateTalk protocol. The controller 102 may then transmit the newly generated "ClimateTalk demand request" to the ClimateTalk HVAC unit 104 over "Network 1". Since the controller 102 has established itself as the sole ClimateTalk thermostat in "Network 1", the Climate HVAC unit 104 accepts and provides output in accordance with the "ClimateTalk demand request" as received from the "Network 1" address of the controller 102.

The combination of FIGS. 5A-5G illustrates a schematic for one implementation of the zone control system 100 illustrated in FIG. 1. It will be understood, however, that the present disclosure is not limited to the example shown in FIGS. 5A-5G or to any particular implementation. Furthermore, one of ordinary skill will readily appreciate that various aspects of the hybrid zone control system disclosed above may be implemented using different hardware and/or software components and configurations.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A zoned HVAC system comprising:
a first thermostat located in a first zone of the zoned HVAC system configured to communicate in accordance with ClimateTalk network protocol;
a second thermostat located in a second zone of the zoned HVAC system configured to communicate in accordance with the ClimateTalk network protocol;
a first HVAC unit configured to communicate in accordance with the ClimateTalk network protocol; and,
a controller communicatively coupled to each of the first thermostat, the second thermostat, and the first HVAC unit, wherein, the controller is configured to:
establish, in accordance with the ClimateTalk network protocol, a first ClimateTalk network between the controller and the first HVAC unit;
establish, in accordance with the ClimateTalk network protocol, a second ClimateTalk network between the controller and the first ClimateTalk thermostat located in the first zone of the zoned HVAC system,
establish, in accordance with the ClimateTalk network protocol, a third ClimateTalk network between the controller and the second ClimateTalk thermostat located in the second zone of the zoned HVAC system;
wherein the controller identifies itself as a thermostat to the first HVAC unit in the first network and identifies itself as an HVAC unit to the first and second thermostats in the second and third networks in order to bridge at least the first and second networks without the first and second thermostats being aware of each other,
the first ClimateTalk network, the second ClimateTalk network, and the third ClimateTalk network being separate and distinct ClimateTalk networks.

2. The zoned HVAC system of claim 1, wherein the controller is further configured to:
receive a first ClimateTalk network compliant request in accordance with the ClimateTalk network protocol from either the first thermostat located in the first zone over the second network or the second thermostat located in the second zone over the third network;
process the first ClimateTalk network compliant request to determine content of the first ClimateTalk network compliant request;
generate a second ClimateTalk network compliant request based on the content of the first ClimateTalk network compliant request; and,
transmit the second ClimateTalk network compliant request to the first HVAC unit over the first ClimateTalk network in accordance with the ClimateTalk network protocol.

3. The zoned HVAC system of claim 1, wherein the controller is further configured to:
receive a ClimateTalk network compliant message in accordance with the ClimateTalk network protocol from the first HVAC unit over the first ClimateTalk network;
process the ClimateTalk network compliant message to determine content of the ClimateTalk network compliant message;
generate a first ClimateTalk network compliant message for the first thermostat based on the content of the ClimateTalk network compliant message;
generate a second ClimateTalk network compliant message for the second thermostat based on the content of the ClimateTalk network compliant message;
transmit the first ClimateTalk network compliant message to the first thermostat located in the first zone over the second network in accordance with the ClimateTalk network protocol; and,
transmit the second ClimateTalk network compliant message to the second thermostat located in the second zone over the third network in accordance with the ClimateTalk network protocol.

4. The zoned HVAC system of claim 1, further comprising a 24v AC thermostat located in a third zone of the zoned HVAC system.

5. The zoned HVAC system of claim 4, wherein the controller is further configured to:
receive an analog request from the 24v AC thermostat located in the third zone of the zoned HVAC system, the analog request representing a conventional demand for a 24v AC HVAC unit of the zoned HVAC system;
generate a ClimateTalk network compliant request based on the determined analog request; and,
transmit the ClimateTalk network compliant request to the first HVAC unit over the first ClimateTalk network in accordance with the ClimateTalk network protocol.

6. The zoned HVAC system of claim 4, wherein the Controller is further configured to open or close one or more zone dampers of the zoned HVAC system to provide different amounts of output from the first HVAC unit to each of the first zone, the second zone, and the third zone of the zoned HVAC system.

7. The zoned HVAC system of claim 1, wherein the first HVAC unit is a Climate network compliant air conditioning unit.

8. The zoned HVAC system of claim 1, wherein the first HVAC unit is a Climate network compliant heating unit.

9. The zoned HVAC system of claim 1, further comprising a second HVAC unit, where the second HVAC unit is a 24v AC HVAC unit not compliant with the ClimateTalk network protocol, and the controller is further configured to:
receive a first ClimateTalk network compliant request in accordance with the ClimateTalk network protocol from either the first thermostat located in the first zone over the second network or the second thermostat located in the second zone over the third network;
process the first ClimateTalk network compliant request to determine content of the first ClimateTalk network compliant request;
generate a 24v AC analog request based on the content of the first ClimateTalk network compliant request; and,
provide the 24v AC analog request to the second HVAC unit.

10. A method for using multiple ClimateTalk network compliant thermostats in a zoned HVAC system, the method comprising:

establishing, in accordance with the ClimateTalk network protocol, a first ClimateTalk network between a controller and a first ClimateTalk network compliant HVAC unit;

establishing, in accordance with the ClimateTalk network protocol, a second ClimateTalk network between the controller and a first ClimateTalk network compliant thermostat located in a first zone of the zoned HVAC system;

establishing, in accordance with the ClimateTalk network protocol, a third ClimateTalk network between the controller and a second ClimateTalk network compliant thermostat located in a second zone of the zoned HVAC system, wherein the controller identifies itself as a ClimateTalk network compliant thermostat to the first ClimateTalk network compliant HVAC unit in the first ClimateTalk network and identifies itself as a ClimateTalk network compliant HVAC unit to the first and second ClimateTalk network compliant thermostats in the second and third ClimateTalk networks in order to bridge at least the first and second networks such that the first and second thermostats are not aware of each other, wherein, each of the first ClimateTalk network, the second ClimateTalk network, and the third ClimateTalk network are distinct ClimateTalk networks different from each other.

11. The method of claim 10, further comprising:
receiving, at the controller, a first ClimateTalk network compliant request in accordance with the ClimateTalk network protocol from either the first thermostat located in the first zone over the second network or the second thermostat located in the second zone over the third network;

processing the first ClimateTalk network compliant request to determine content of the first ClimateTalk network compliant request;

generating a second ClimateTalk network compliant request based on the content of the first ClimateTalk network compliant request; and, transmitting the second ClimateTalk network compliant request to the first HVAC unit over the first ClimateTalk network in accordance with the ClimateTalk network protocol.

12. The method of claim 11, further comprising:
receiving, at the controller, an analog request from a 24v AC thermostat located in a third zone of the zoned HVAC system, the analog request representing a conventional demand for a 24v AC HVAC unit of the zoned HVAC system;

generating a ClimateTalk network compliant request based on the determined analog request; and, transmitting the ClimateTalk network compliant request to the first HVAC unit over the first ClimateTalk network in accordance with the ClimateTalk network protocol.

13. The method of claim 11, further comprising:
receiving a second ClimateTalk network compliant request in accordance with the ClimateTalk network protocol from either the first thermostat located in the first zone over the second network or the second thermostat located in the second zone over the third network;

processing the second ClimateTalk network compliant request to determine content of the second ClimateTalk network compliant request;

generating a 24v AC analog request based on the content of the first ClimateTalk network compliant request; and, providing the 24v AC analog request to a second HVAC unit of the zoned HVAC system, the second HVAC unit being a 24v AC HVAC unit not compliant with the ClimateTalk network protocol.

14. The method of claim 10, further comprising:
receiving, at the controller, a ClimateTalk network compliant message in accordance with the ClimateTalk network protocol from the first HVAC unit over the first ClimateTalk network;

processing the ClimateTalk network compliant message to determine content of the ClimateTalk network compliant message;

generating a first ClimateTalk network compliant message for the first thermostat based on the content of the ClimateTalk network compliant message;

generating a second ClimateTalk network compliant message for the second thermostat based on the content of the ClimateTalk network compliant message;

transmitting the first ClimateTalk network compliant message to the first thermostat located in the first zone over the second network in accordance with the ClimateTalk network protocol; and, transmitting the second ClimateTalk network compliant message to the second thermostat located in the second zone over the third network in accordance with the ClimateTalk network protocol.

* * * * *